(12) United States Patent
Nicolescu et al.

(10) Patent No.: US 7,912,161 B2
(45) Date of Patent: Mar. 22, 2011

(54) METHOD AND APPARATUS FOR LAYER 1 / LAYER 2 CONVERGENCE DECLARATION FOR AN ADAPTIVE EQUALIZER

(75) Inventors: Alex Nicolescu, Nepean (CA); Kenji Suzuki, Kanata (CA); Brian Wall, Stittsville (CA); Michael McDonnell, Osgoode (CA)

(73) Assignee: Cortina Systems, Inc., Sunnyvale, CA (US)

( * ) Notice: Subject to any disclaimer, the term of this patent is extended or adjusted under 35 U.S.C. 154(b) by 1170 days.

(21) Appl. No.: 11/593,652

(22) Filed: Nov. 7, 2006

(65) Prior Publication Data

US 2008/0107165 A1  May 8, 2008

(51) Int. Cl.
*H03D 1/06* (2006.01)
*H03D 11/04* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .................. 375/348; 375/233; 375/359

(58) Field of Classification Search .......... 375/229–230, 375/232–233, 316, 346, 348, 354, 359
See application file for complete search history.

(56) References Cited

U.S. PATENT DOCUMENTS

| 7,526,053 | B1 * | 4/2009 | Sallaway et al. | 375/350 |
|---|---|---|---|---|
| 2002/0041570 | A1 * | 4/2002 | Ptasinski et al. | 370/252 |
| 2003/0182619 | A1 * | 9/2003 | Greiss et al. | 714/798 |
| 2010/0095185 | A1 * | 4/2010 | Ganga et al. | 714/758 |

* cited by examiner

*Primary Examiner* — David C Payne
*Assistant Examiner* — James M Perez (57) ABSTRACT

A novel method and apparatus is disclosed, that embeds with, or otherwise makes available to an adaptive equalizer, suitable for use in IEEE 10G-LRM standard compliant receivers, digital logic that monitors some of the Layer 1 and preferably some of the Layer 2 processing that typically occurs after the equalization step during decoding and processing of the record data stream. From this additional logic information, the equalizer is able to make a much more accurate prediction of equalizer convergence by counting processing errors and prove convergence by calculation of BER. The novel method and apparatus are applicable to ASIC embodiments and the complexity of the logic information obtained can be programmably scaled back or enhanced as appropriate in light of the particular communication environment.

36 Claims, 4 Drawing Sheets

METHOD AND APPARATUS FOR LAYER 1 / LAYER 2 CONVERGENCE DECLARATION FOR AN ADAPTIVE EQUALIZER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to adaptive equalizers and more particularly to a novel method and apparatus for declaring convergence for an adaptive equalizer.

(2) Description of Related Art including information disclosed under 37 CFR 1.97 and 1.98.

In modern asynchronous communications systems, a data stream is transmitted across a communications channel by a transmitter to a receiver without any ancillary clocking or synchronizing information. In order to properly interpret and process the data stream at the receiver, the data stream itself must be processed to extract an underlying clock signal that can drive the circuitry that will decode and extract the data from the data stream.

In a perfect communications environment, that is, a noiseless communications channel without band-limiting, such clock and data recovery is relatively straightforward. However, typically, the communications channel is relatively noisy, may also be band-limited and effectively distorts the signal conveyed thereby.

This distortion is frequently exhibited as inter-symbol interference (ISI).

Accordingly, as a prelude to the clock and data recovery process, the data stream must be conditioned in order to remove ISI and/or compensate or attenuate the noise in the channel as much as possible and thus maximize the ability of the clock and data recovery circuitry to perform its tasks accurately.

The conditioning step is typically performed by an equalizer. Preferably, the equalizer is an adaptive equalizer that adapts its parameters to the time-varying data stream and effectively minimizes the bit error rate (BER).

Adaptive equalizers are well known in the art. They may be either analog or digital or a combination thereof. As the processing of the data stream proceeds, they typically converge to a steady-state.

Many communications systems are configured so that the data stream initially provides a known training sequence before any data. This provides the equalizer both time to converge and a known bit sequence that will assist in processing.

While the equalizer preferably converges to a situation where it correctly processes the data stream, it is possible to conceivably converge to a situation where it incorrectly processes the received data stream. Such a situation is known in the art as false convergence.

In theory, in order to determine whether or not the convergence of an adaptive equalizer has been successful, one could look at the BER. False convergence would be indicated by a high BER.

Most adaptive equalizers in the art typically do not actually measure the BER to confirm that the adaptive equalizer is functioning properly. This is because hitherto, the calculation of BER demands relatively complex logic. Moreover, the BER is calculable only after the data has been decoded, which usually occurs downstream of the equalization process.

Furthermore, until now there have not been scenarios where the need to minimize BER has called for direct measurement of this metric.

Therefore, inferences about the BER are typically drawn from circumstantial factors, whose parameters are more easily, quickly or conveniently obtained. For example, one popular metric is signal to noise ratio (SNR). Generally, a large SNR is an indication of low BER and the attendant inference that the ISI has been reduced to a tolerable level so that the signal can be properly recovered. One advantage of this indirect metric is that the equalizer can obtain SNR information by monitoring certain aspects of the (often analog) circuitry of the equalizer itself.

This metric is not universally accurate. For example, the adaptive equalizer may have converged however, but to a false location. For example, if the equalizer has converged falsely, it is conceivable that the receiver is in fact inverting the recovered data. In this scenario, the SNR would show perfect performance, but in reality, the BER would be 100%.

In many cases, safeguards may be engineered into the receiver to reduce the likelihood that a measurement of low SNR imparts a false indication of low BER. For example, if the equalizer is relatively simple and has only a few taps, convergence may be fairly straightforward.

Furthermore, often the channel does not severely distort the data so that only minimal equalization is called for. In such situations, data can still be correctly recovered relatively easily, so that adaptive equalization, which is more complicated and thus more likely to falsely converge, is unnecessary.

However, as demand for channel capacity and faster data rates increases, newer communications standards impose more and more rigorous demands that in turn call for more complicated equalizers.

One such standard is IEEE 10G-LRM, which is a part of IEEE 802.3AQ. This standard specifies rules for the transmission of data over a multimode fiber.

The IEEE 10G-LRM standard demands support for very specific types of multimode fiber, each having different ISI impairments. These demands are not limited to the stressed receiver tests section of the standard.

Further, the standard does not make provision for training sequences, so that any equalization is blind. Blind equalization is generally acknowledged as one of the more demanding equalization problems.

All of these demands impose significant stresses on standard-compliant receivers. Generally, stronger equalization is called for in an attempt to satisfy these demands. However, this concomitantly and substantially increases the opportunity for and the likelihood of false convergence, especially when relying upon the conventional low SNR metric.

What is therefore needed is a novel metric for declaring true convergence of a receiver's adaptive equalizer under current and future asynchronous communications standards.

SUMMARY OF INVENTION

The present invention seeks to provide an improved adaptive equalizer adapted for use with current and evolving communications standards that no longer rely upon outdated metrics such as low SNR.

A novel method and apparatus is disclosed that embeds within or otherwise makes available, to the adaptive equalizer, digital logic that monitors some of the Layer 1 and preferably some of the Layer 2 processing that typically occurs after the equalization step during the decoding and processing of the received data stream. From this additional logic information, the equalizer is able to make a much more accurate prediction of equalizer convergence and even prove convergence by calculation of the BER.

The novel method and apparatus are applicable to application-specific integrated circuit (ASIC) embodiments and the complexity of the logic information obtained can be progressively scaled back or enhanced as appropriate in light of the particular communications channel environment.

According to a first broad aspect of an embodiment of the present invention, there is disclosed a method for establishing convergence of an adaptive equalizer in a receiver of an asynchronous communications system, the adaptive equalizer for removing inter-symbol interference (ISI) from a received data stream before providing it to a clock and data recovery module, the method comprising the steps of: (a) configuring the equalizer with an initial set of input conditions; (b) performing Layer 1 protocol delineation and framing on a recovered data stream from the clock and data recovery module; (c)determining whether the Layer 1 protocol delineation and framing exceeded a minimum Layer 1 threshold performance indicative of achieving a satisfactory bit error rate (BER) for the Layer 1 protocol delineation and framing; (d)and if the Layer 1 protocol delineation and framing did not exceed the minimum Layer 1 threshold performance, reconfiguring the equalizer with a subsequent set of input conditions and repeating steps (b) through (d).

Preferably, the method further comprises the steps of (e) calculating a bit error rate of the Layer 1 protocol delineation and framing; and (f)if the bit error rate for the Layer 1 protocol delineation and framing exceeds a minimum acceptable Layer 1 bit error rate, reconfiguring the equalizer with a subsequent set of input conditions and repeating steps (b)through (f).

Preferably, the method further comprises the steps of (g) performing Layer 2 protocol delineation and framing on a recovered data stream from the clock and data recovery module;(h)determining whether the Layer 2 protocol delineation and framing exceeded a minimum Layer 2 threshold performance indicative of achieving a satisfactory bit error rate (BER) for the Layer 2 protocol delineation and framing; and (i)if the Layer 2 protocol delineation and framing did not exceed the minimum Layer 2 threshold performance, reconfiguring the equalizer with a subsequent set of input conditions and repeating steps (b)through (i).

Preferably, the method further comprises the steps of (j)calculating the bit error rate of the Layer 2 protocol delineation and framing; and (k)if the bit error rate for the Layer 2 protocol delineation and framing did not fall below a minimum acceptable Layer 2 bit error rate, reconfiguring the equalizer with a subsequent set of input conditions and repeating steps (b) through (k).

According to a second broad aspect of an embodiment of the present invention, there is disclosed an adaptive equalizer module for removing inter-symbol interference (ISI) from an incoming data stream in accordance with a set of input conditions and generating an equalized data stream; a clock and data recovery module for recovering a clock signal and a plurality of data bits from the equalized data stream; a Layer 1 protocol delineation and framing sub-system for performing Layer 1 protocol delineating and framing on the data bits; a Layer 1 protocol delineation and framing monitor for determining whether the Layer 1 protocol delineation and framing exceeded a minimum Layer 1 threshold performance indicative of achieving a satisfactory bit error rate (BER) for the Layer 1 protocol; and an equalizer condition generator for generating an initial set of input conditions for the equalizer module and for generating a second set of input conditions for the equalizer module if the Layer 1 protocol delineation and framing, performed on the plurality of data bits recovered from the equalized data stream corresponding to a current set of input conditions of the equalizer module, did not exceed the minimum Layer 1 threshold performance.

Preferably, the equalizer further comprises a Layer 1 protocol delineation and framing bit error rate (BER) calculator for determining a bit error rate for the Layer 1 protocol; wherein the equalizer condition generator is adapted to generate a third set of input conditions for the equalizer module if the Layer 1 protocol delineation and framing, performed on the plurality of data bits recovered from the equalized data stream corresponding to a current set of input conditions of the equalizer, had a bit error rate for the Layer 1 protocol that exceeded a minimum acceptable Layer 1 threshold.

Preferably, the equalizer further comprises a Layer 2 protocol delineation and framing monitor for determining whether the Layer 2 protocol delineation and framing exceeded a minimum Layer 2 threshold performance indicative of achieving a satisfactory bit error rate (BER) for the Layer 2 protocol; wherein the equalizer condition generator is adapted to generate a fourth set of input conditions for the equalizer module if the Layer 2 protocol delineation and framing, performed on the plurality of data bits recovered from the equalized data stream corresponding to a current set of input conditions of the equalizer module did not exceed the minimum Layer 2 threshold performance.

Preferably, the equalizer further comprises a Layer 2 protocol delineation and framing bit error rate (BER) calculator for determining a bit error rate for the Layer 1 protocol; wherein the equalizer condition generator is adapted to generate a fifth set of input conditions for the equalizer module if the Layer 2 protocol delineation and framing, performed on the plurality of data bits recovered from the equalized data stream corresponding to a current set of input conditions of the equalizer, had a bit error rate for the Layer 2 protocol that exceeded a minimum acceptable Layer 2 threshold.

BRIEF DESCRIPTION OF THE SEVERAL VIEWS OF THE DRAWING(S)

The embodiments of the present invention will now be described by reference to the following figures, in which identical reference numerals in different figures indicate identical elements and in which.

DETAILED DESCRIPTION OF THE INVENTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
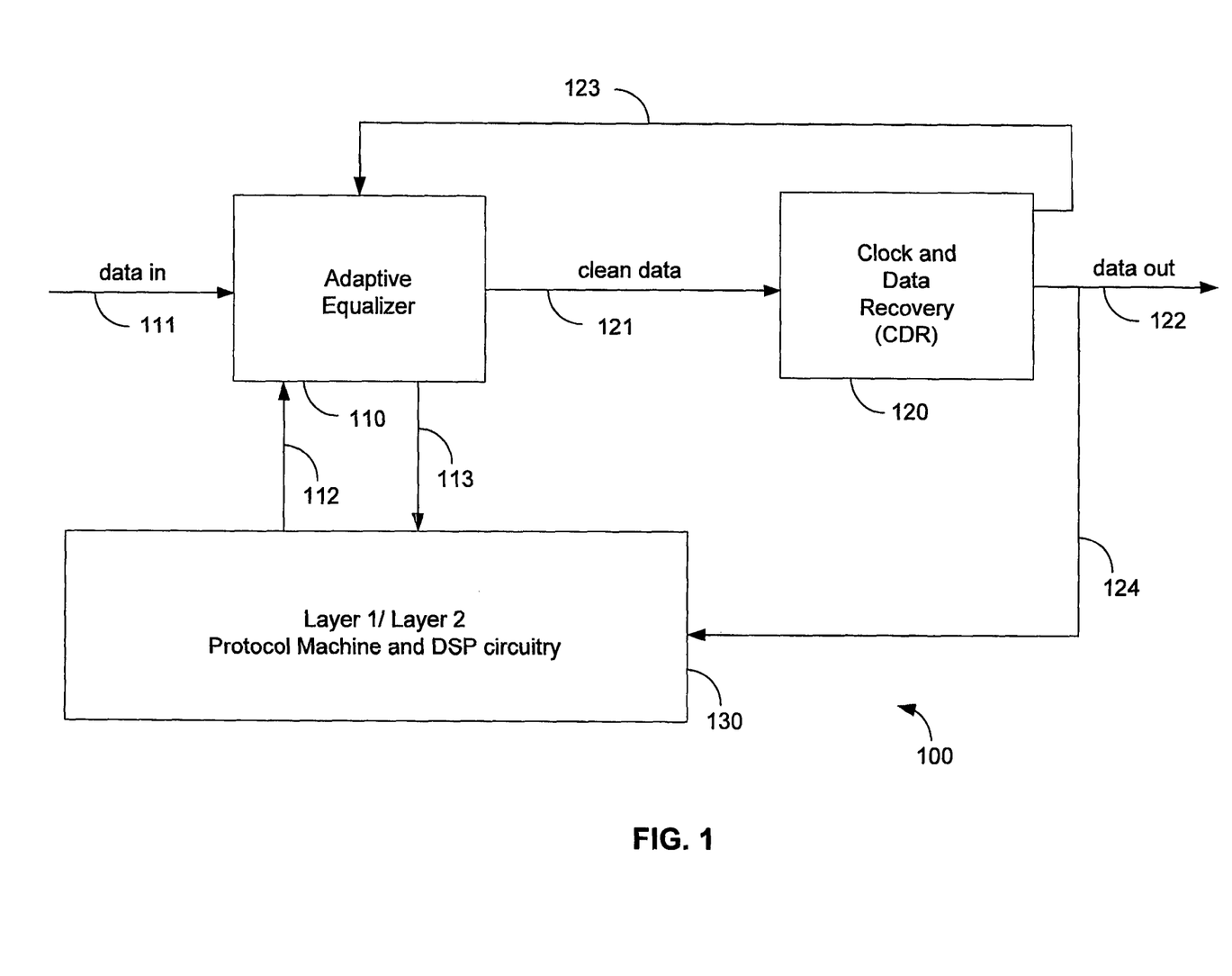
FIG. 1 is a simplified block diagram of the inventive adaptive equalizer according to an embodiment of the present invention.

Referring to FIG. 1, there is shown a simplified block diagram of the inventive adaptive equalizer shown generally at 100, according to a first embodiment of the present invention. The inventive adaptive equalizer 100 comprises an equalizer 110, a clock and data recovery (CDR) module 120 and a Layer 1/Layer 2 protocol machine with digital signal processing (DSP) circuitry 130.

The equalizer 110 accepts an input data stream 111 that constitutes line data received by the receiver (not shown), which is expected to suffer from ISI and generates a clean data stream 121 that it outputs to the CDR module 120. It also accepts equalization coefficients along a coefficient control line 112 from the protocol machine 130 and generates a feedback signal along a feedback control line 113 to the protocol machine 130. Finally, it accepts a clock signal along a clock line 123 from the CDR module 120.

The equalizer 110 is a conventional adaptive equalizer well known in the art with the equalization coefficients being determined by the protocol machine 130 and provided to the equalizer 110 along coefficient control line 112.

The equalizer 110, following a conventional design, comprises a fractional Feed Forward Equalizer (FFE) (not shown), a Decision Feedback Equalizer (DFE) (not shown) and a data slicer (not shown). The task of the equalizer 110 is to remove the ISI that may have accumulated on the communication channel path between the transmitter's driver (not shown) and the equalizer 110.

The equalizer 110 uses a Least Mean Square (LMS) algorithm or varieties thereof to adapt. The output of the FFE and DFE is fed to the data slicer, which quantifies its input.

The CDR module 120 accepts the clean data stream 121 from the equalizer 110 and generates an output data stream that represents reclocked data that it outputs to the rest of the receiver (not shown) along a reclocked data bus 122. As well, it generates a clock signal that it outputs to the equalizer 110 along clock line 123. Finally, it forwards the reclocked data to the protocol machine 130 along reclocking bus 124.

Like the equalizer 110, the CDR module 120 is a conventional clock and data recovery module such as is well known in the art, with the exception of the additional clock signal that it outputs along clock line 123. One preferred implementation of the CDR module 120 is a Hogge type phase detector CDR, which locks to the exact frequency and phase of the clean data stream 121 in order to properly sample it.

The Layer 1/Layer 2 protocol machine and digital signal processing (DSP) circuitry 130 accepts as input reclocked data along a reclocking bus 124 from the CDR module 120, and the feedback signal from the equalizer 110 along feedback control line 113, and generates equation coefficients that it outputs to the equalizer 110 along coefficient control line 112.

The protocol machine 130 repatriates some or all of the Layer 1 and Layer 2 protocol circuitry measuring the quality of the signal after equalization and clock and data recovery, which is conventionally located off-board and downstream in the receiver (not shown) in order to provide a feedback capability to the inventive adaptive equalizer 100.

For the purposes of this discussion, as described in the Open Systems Interconnection (OSI) Reference Model, Layer 1 or physical layer protocols encode/decode and/or frame/synchronize information bits between two endpoints over a communications channel. Layer 2 or data link layer protocols provide the functional and procedural means to transfer data between network entities and to detect and/or possibly correct errors in the physical layer.

The protocol machine 130 operates by providing, to the equalizer 110, several sets of conditions, such as equalization coefficients based on feedback from the Layer 1 and Layer 2 protocol circuitry. If the feedback indicates that the conditions provided do not result in convergence of the equalizer, alternative sets of conditions will be provided until satisfactory results are achieved.

Figure 2:
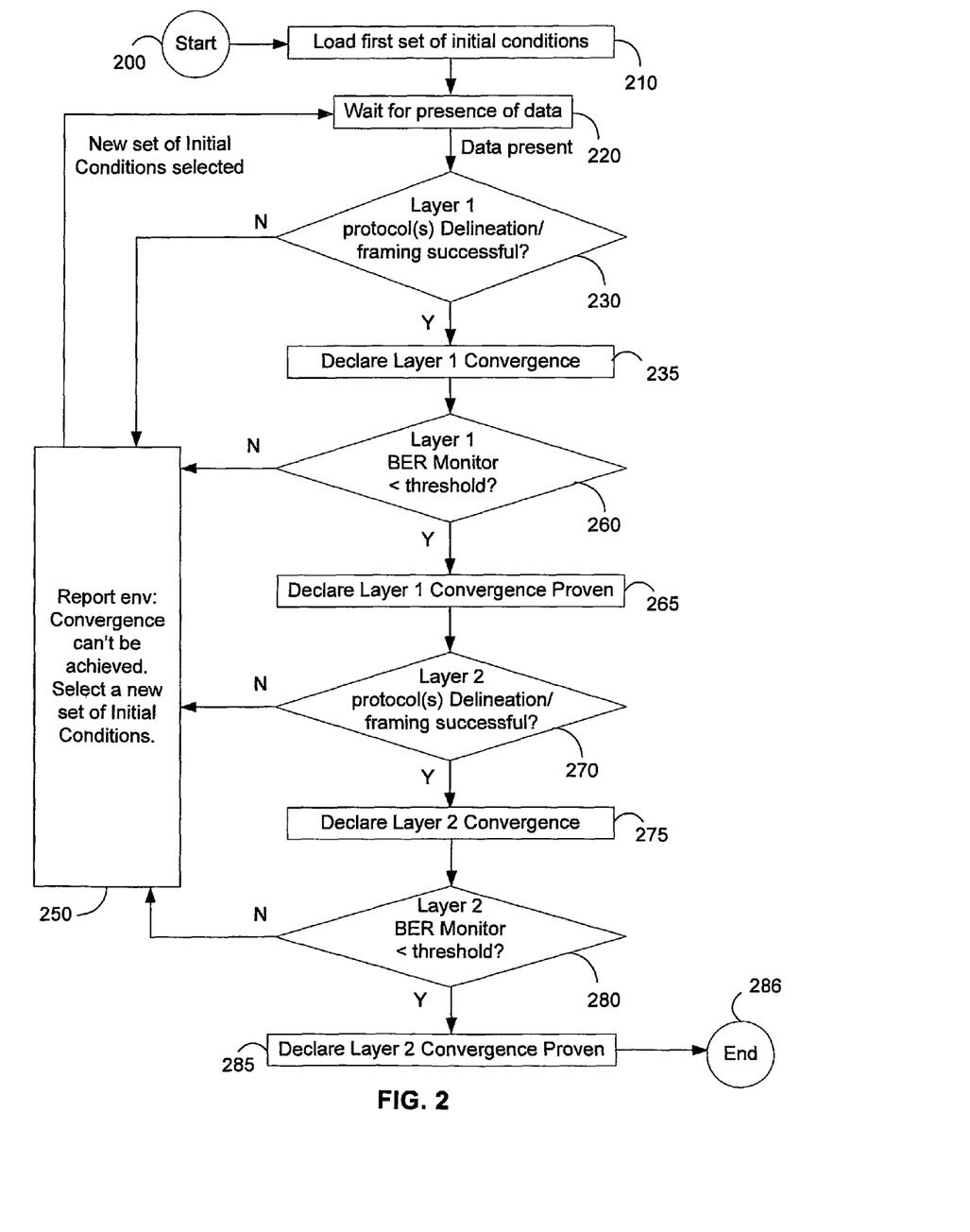
FIG. 2 is a flow chart showing processing steps in the Layer 1 and/or Layer 2 processing according to the embodiment of FIG. 1.

In general, the generation of these sets of initial conditions and the consequent operation of the inventive adaptive equalizer 100 is described in the flow chart that appears as FIG. 2. After a start-up or reset condition 200, a first set of initial conditions is submitted 210 to the equalizer 110 along the coefficient control line 112. Preferably, this is in the form of equalization coefficients for the equalizer 110. Those having ordinary skill in this art will readily recognize that the choice of equalization coefficients has a significant impact on the performance of the removal of ISI.

After the provision of the initial conditions, a timer counts down a predetermined period of time 220 to permit the equalizer 110 to process some of the input data 111 and generate reclocked data along reclocking bus 124 using the provided set of initial conditions. Those having ordinary skill in this art will readily recognize that rather than having a predetermined period of time, the protocol machine 130 may alternatively have some mechanism to detect the receipt of reclocked data along reclocking bus 124 that reflects the provision of the provided set of initial conditions.

However it is recognized, when data reflecting the provision of the provided set of initial conditions arrives along reclocking bus 124, the protocol machine 130 attempts to reproduce the applicable Layer 1 protocol delineation/framing processing at step 230. If the attempt is unsuccessful, an error condition is reported and a different set of initial conditions is provided (step 250) to the equalizer 110 along the coefficient control line 112 and the protocol machine 130 resumes waiting (step 220) for the arrival of data reflecting the new set of initial conditions.

On the other hand, if the attempt is successful, in that the reclocked data is properly delineated/framed according to the applicable Layer 1 protocol on a consistent basis for a predetermined period of time, convergence is declared at a Layer 1 level 235 and the processing proceeds to step 260.

As discussed below, if appropriate to the type and environment of the communications channel and the encoding scheme used, the protocol machine 130 thereafter attempts to actually calculate the Layer 1 BER on the processed data at step 260. If the attempt is unsuccessful, in that the BER exceeds a predetermined acceptable BER threshold, an error condition is reported and a different set of initial conditions is provided at step 250 to the equalizer 110 along the coefficient control line 112 and the protocol machine 130 resumes waiting (step 220) for the arrival of data reflecting the new set of initial conditions.

On the other hand, if the attempt is successful, in that the BER is less than a predetermined acceptable BER threshold, convergence is declared proven at a Layer 1 level 265 and the processing proceeds to step 270.

As discussed below, if appropriate to the type and environment of the communications channel and the encoding scheme used, the protocol machine 130 thereafter attempts to reproduce the applicable Layer 2 protocol delineation/framing processing at step 270. If the attempt is unsuccessful, an error condition is reported and a different set of initial conditions is provided (step 250) to the equalizer 110 along the coefficient control line 112 and the protocol machine 130 resumes waiting (step 220) for the arrival of data reflecting the new set of initial conditions.

On the other hand, if the attempt is successful, in that the reclocked data is properly delineated/framed according to the applicable Layer 2 protocol on a consistent basis for a predetermined period of time, convergence is declared at a Layer 2 level at step 275 and the processing proceeds to step 280.

Finally, as discussed below, if appropriate to the type and environment of the communications channel and the encoding scheme used, the protocol machine 130 attempts to actually calculate the Layer 2 BER on the processed data at step 280. If the attempt is unsuccessful, in that the BER exceeds a predetermined acceptable BER threshold, an error condition is. reported and a different set of initial conditions is provided (step 250) to the equalizer 110 along the coefficient control line 112 and the protocol machine 130 resumes waiting (step 220) for the arrival of data reflecting the new set of initial conditions.

On the other hand, if the attempt is successful, in that the BER is less than a predetermined acceptable BER threshold, convergence is declared proven at a Layer 2 level and processing either terminates at step 286 or resets at step 200.

Those having ordinary skill in this art will readily recognize that not each of processing steps 260, 270 and 280 need to be conducted. While convergence will only be proved upon a true BER calculation, whether at the Layer 1 level 260 or the Layer 2 level 280, it may, in some scenarios, be sufficient to simply declare convergence at a Layer 1 level 230 or at a Layer 2 level 270, or to simply provide processing at a Layer 1 level, that is, terminating at processing step 260.

The declaration of convergence, whether at a Layer 1 level 260 or a Layer 2 level 280, assumes that convergence has been achieved if delineation and framing has been consistently achieved. While not strictly accurate, those having ordinary skill in this art will readily recognize that this assumption is generally more accurate than the prior art assumptions of convergence that are predicated solely or primarily on SNR values.

The structure of the protocol machine 130 will depend upon the communications protocol employed at a Layer 1 and/or Layer 2 level.

Figure 3:
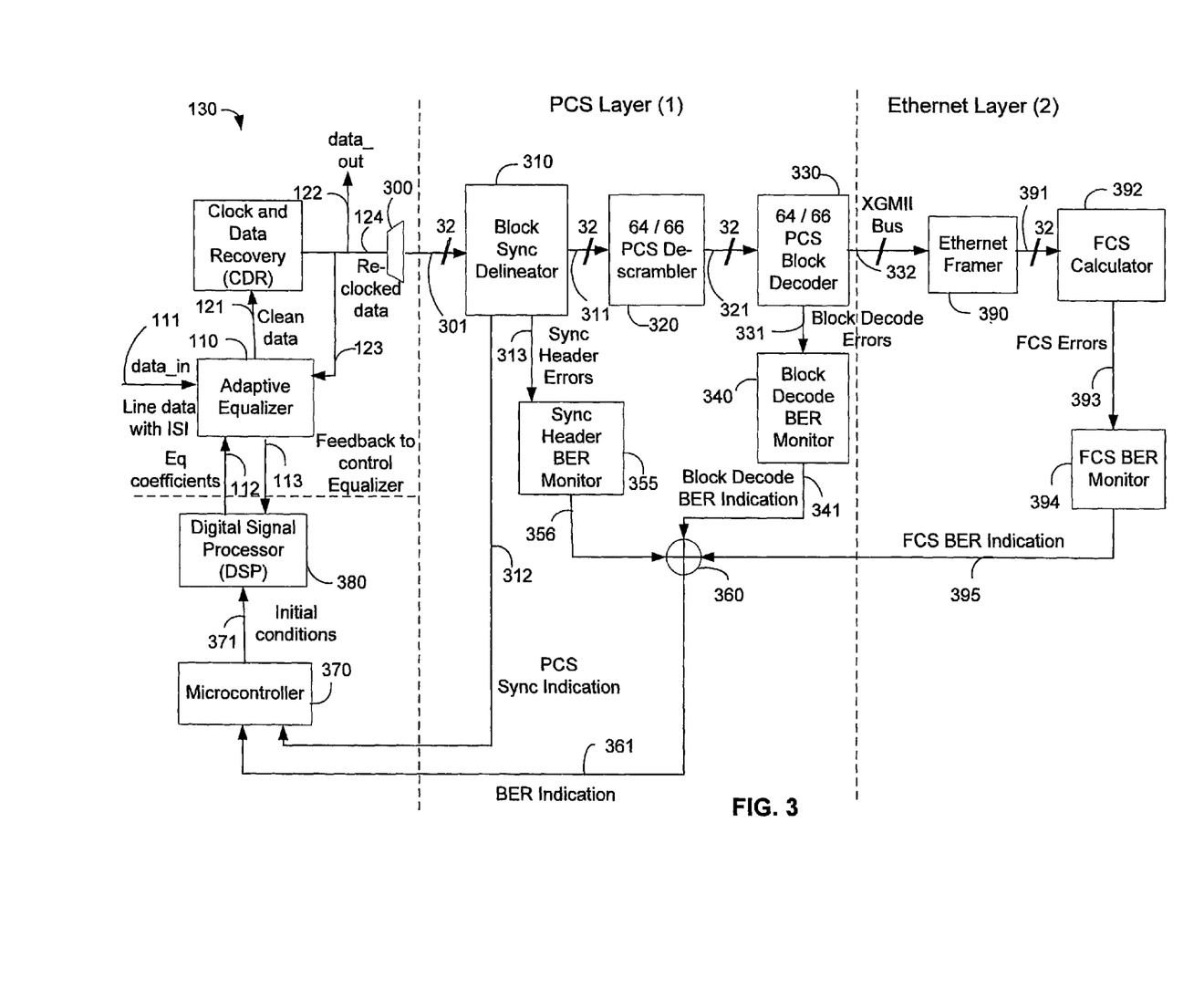
FIG. 3 is a block diagram of the protocol machine according to an exemplary embodiment in a PCS/Ethernet Layer 1/Layer 2 protocol environment.

For example, FIG. 3 shows in exemplary fashion, the structure of the protocol machine 130 in a communications system employing a PCS Layer 1/Layer 2 protocol, as described in Clause 49 of the IEEE 802.3 standard specification.

The protocol machine 130 comprises a demultiplexer 300, a block sync delineator 310, a 64/66 PCS descrambler 320, a 64/66 PCS block decoder 330, a block decode BER monitor 340, a sync header BER monitor 355, a BER compiler 360, a microcontroller 370, a digital signal processor (DSP) 380, an Ethernet framer 390, a Frame Check Sequences (FCS) calculator 392 and an FCS BER monitor 394.

In this exemplary embodiment, the block sync delineator 310, the 64/66 PCS descrambler 320 and the 64/66 PCS block decoder 330 comprise the Layer 1 or PCS layer circuitry in the protocol machine 130, while the Ethernet framer 390 and the FCS calculator 392 comprise the Layer 2 or Ethernet layer circuitry in the protocol machine 130.

The demultiplexer 300 accepts as input the reclocked data along reclocking bus 124 and generates a parallel data stream along a parallel data bus 301, wherein the serial reclocked data is de-multiplexed by demultiplexer 300 into 32 bit parallel data, the first bit arriving along the the line interface being latched into bit 0 of the parallel data bus 301, the $2^{nd}$ bit being latched into bit 1 of the parallel data bus 301, and so on with the $32^{nd}$ bit being latched into bit 31 of the parallel data bus 301.

The block sync delineator 310 accepts as input a copy of the reclocked data from the CDR module 120 along the parallel data bus 301 from the demultiplexer 300, generates delineated data to the 64/66 PCS descrambler 320 along a delineated data bus 311, generates a PCS Sync indication to the microcontroller 370 along a sync control line 312 and transmits sync header error counts to the sync header BER monitor 355 along a sync error control line 313.

By virtue of the exemplary PCS protocol employed, those having ordinary skill in this art will recognize that the parallel data bus 301 will comprise 32 parallel data lines, as is the delineated data bus 311 and a descrambled data bus 321 described infra.

The block sync delineator 310 performs 64/66 block delineation, by finding 64 consecutive pairs of sync bits, in a manner known to those having ordinary skill in this art. The results of the block delineation exercise are reported as a PCS sync indication to the microcontroller 370 along the sync control line 312 and as sync header error counts to the sync header BER monitor 355 along the sync error control line 313. It also outputs delineated blocks to the 64/66 PCS descrambler 320 along delineated data bus 311 as specified in Clause 49 of the IEEE 802.3 standard.

The 64/66 PCS descrambler 320 accepts as input the delineated blocks along the delineated data bus 311 and generates descrambled blocks of data along the descrambled data bus 321. The 64/66 PCS descrambler 320 descrambles the delineated blocks and outputs them to the 64/66 PCS block decoder 330.

The 64/66 PCS block decoder 330 accepts as input the descrambled blocks along the descrambled data bus 321 and transmits block decode error counts to the block decode BER monitor 340 along a block decode error control line 331. Additionally, it transmits PCS delineated blocks along a 10 Gigabit Media Independent Interface (XGMII) bus 332 to the Ethernet framer 390.

The block decode BER monitor 340 accepts as input the block decode error counts along the block decode error control line 331 and transmits a BER figure of merit along a BER figure of merit control line 341 to the BER compiler 360. The BER figure of merit is generated as a function of the number of block decode errors accumulated over a pre-determined period of time.

The sync header BER monitor 355 accepts as input the sync header error counts along the sync error control line 313 from the block sync delineator 310 and transmits a sync error figure of merit along a sync header figure of merit control line 356 to the BER compiler 360. The sync header figure of merit is generated as a function of the number of sync bit errors accumulated over a pre-determined period of time.

The Ethernet framer 390 accepts as input the PCS delineated blocks along the XGMII bus 332 from the 64/66 PCS block decoder 330, frames them and transmits them along a framed bus 391 to the FCS calculator 392.

The FCS calculator 392 accepts as input the Ethernet frames along the framed bus 391 from the Ethernet framer 390 and transmits FCS error counts to the FCS BER monitor 394 along an FCS error control line 393.

The FCS calculator 392 calculates Frame Check Sequences (FCS) on the incoming Ethernet frames and compares them against the received PCS bytes in the frame in accordance with the dictates of Clause 2 of the IEEE 802.3 specification.

The FCS BER Monitor 394 accepts as input the FCS error counts along the FCS error control line 393 and transmits a FCS BER figure of merit along an FCS BER figure of merit control line 395 to the BER compiler 360. The FCS BER figure of merit is generated as a function of the number of FCS errors accumulated over a pre-determined period of time.

The BER compiler 360 receives the BER figure of merit along the BER figure of merit control line 341 from the block decode BER monitor 340, the sync header figure of merit along the sync header figure of merit control line 356 from the sync header BER monitor 355 and the FCS BER figure of merit along the FCS BER control line 395 from the FCS BER monitor 394. It transmits a BER indication to the microcontroller 370 along a BER indication control line 361. The BER indication is an appropriately weighted combination of some or all of the sync header figure of merit (Layer 1 declaration), the BER figure of merit (Layer 1 proof) and the FCS BER figure of merit Layer 2 proof, such as is well understood by those having ordinary skill in this art.

Those having ordinary skill in this art will readily appreciate that under the exemplary PCS/Ethernet protocols, Layer 2 proof is advisable since BER computation at the Layer 1 level does not cover the data codewords. In this exemplary embodiment, Layer 2 declaration is not appropriate. Nevertheless, those having ordinary skill in this art will readily recognize that other Layer 1/Layer 2 protocol combinations may call for both Layer 2 declaration and proof assessments.

The microcontroller 370 accepts as input the PCS sync indication along the sync control line 312 and the BER indication along the BER indication control line 361, determines whether or not there has been convergence, and if not, generates a set of initial conditions along an initial condition control line 371 to the digital signal processor 380. These sets of initial conditions may be generated in a manner familiar to those having ordinary skill in this art, including but not limited to being pre-defined and/or hard-coded, user-defined, randomly generated or reformatted in an adaptive manner from previous applications of the present invention.

The microcontroller 370 also starts the Least Mean Square (LMS) algorithm and monitors that PCS sync and/or good BER performance is achieved.

The digital signal processor 380 accepts as input a set of initial conditions along the initial condition control line 371 and the feedback signals along the feedback control line 113 and provides a set of initial conditions along the coefficient control line 112 to the equalizer 110, comprising weights for the FFE and DFE steps of the equalizer 110. The feedback signals are formatted as data the output of the data slicer of the equalizer 110 and an error signal, which comprises the difference between the input of the data slicer of the equalizer 110 and its output.

The digital signal processor 380 executes the coefficient update portion of the LMS algorithm using the initial conditions supplied by the microcontroller 370.

Figure 4:
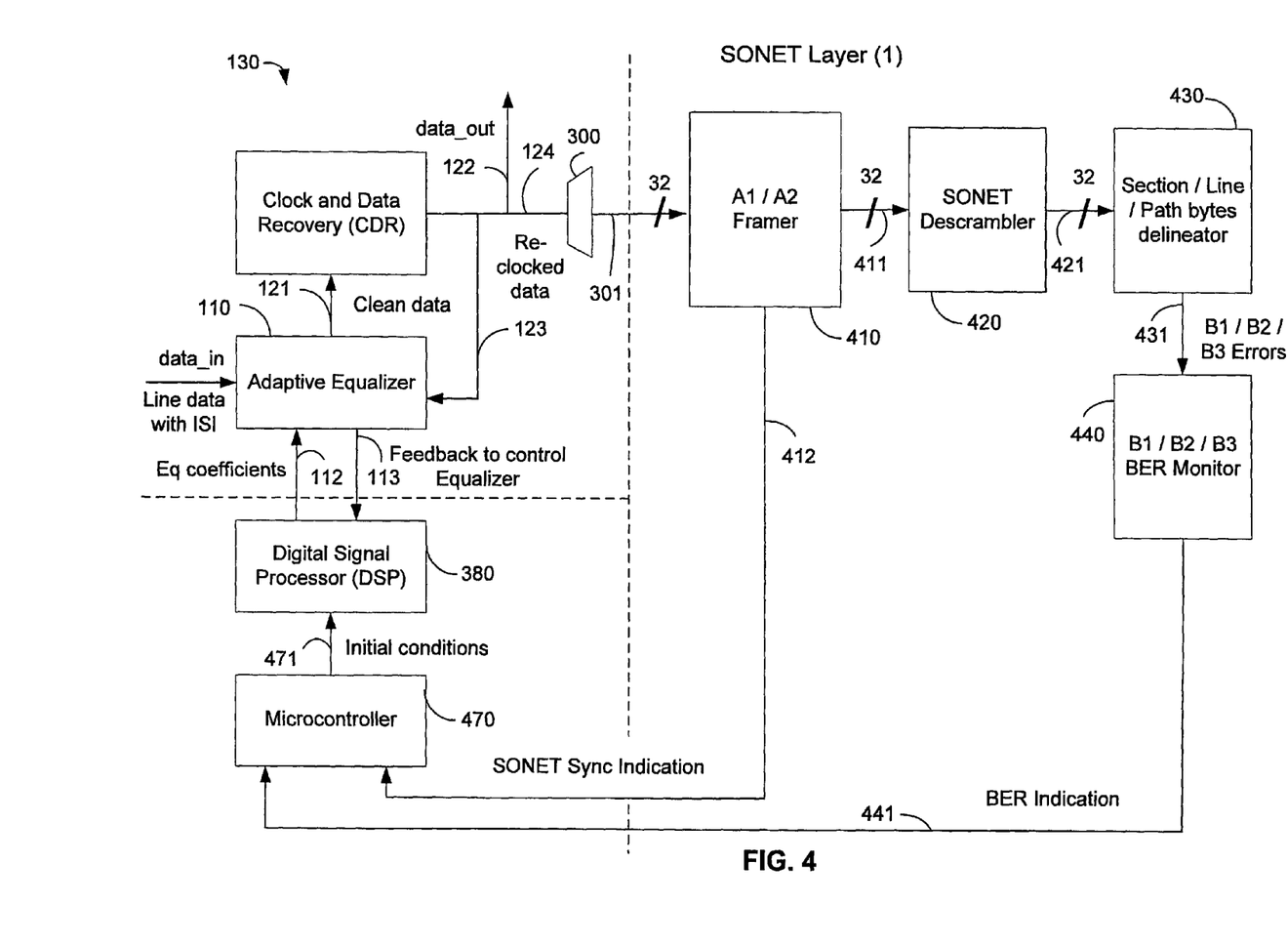
FIG. 4 is a block diagram of the protocol machine according to an exemplary embodiment in a SONET protocol Layer 1 environment.

In an alternative exemplary embodiment, the SONET protocol as specified by the Bellcore GR-253 standard specification may be used as the Layer 1 protocol, as shown in the simplified block diagram of FIG. 4. In the SONET protocol, unlike the exemplary PCS/Ethernet protocol combination shown in FIG. 3, by definition Layer 2 protocol processing is unnecessary because the B1/B2/B3 parity bytes cover all the bytes of the SONET frame, so that BER can be accurately calculated over the number of errors found in these bytes. An additional layer, on top of the sonnet layer, can add no extra information besides the BER computed at the sonnet level.

In this embodiment, the protocol machine 130 comprises the demultiplexer 300 a A1/A2 framer 410, a SONET descrambler 420, a section/line/path bytes delineator 430, a B1/B2/B3 BER monitor 440, a microcontroller 470 and the digital signal processor (DSP) 380.

The A1/A2 framer 410 accepts as input a copy of the reclocked data from the CDR module 120 along the parallel data bus 301, generates framed data and forwards it to the SONET descrambler 420 along a framed data bus 411 and generates a SONET Sync indication to the microcontroller 470 along a SONET sync control line 412.

By virtue of the exemplary SONET protocol employed, those having ordinary skill in this art will recognize that the parallel data bus 301 will comprise 32 parallel data lines, as is the framed data bus 411 and a SONET descrambled data bus 421 described infra.

The A1/A2 framer 410 performs framing, by finding 2 consecutive good A1/A2 patterns separated by 125 microseconds, as specified by the Bellcore GR-253 standard, in a manner known to those having ordinary skill in this art. The results of the framing exercise is reported to the microcontroller 470 along the SONET sync control line 412. It also outputs delineated SONET frames to the SONET descrambler 420 along the framed data bus 411 as specified in the Bellcore GR-253 standard.

The SONET descrambler 420 accepts as input the delineated SONET frames along the framed data bus 411 and generates descrambled blocks of data along the SONET descrambled data bus 421. The SONET descrambler 420 descrambles the delineated frames and outputs them to the section/line/path bytes delineator 430.

The section/line/path bytes delineator 430 accepts as input the descrambled frames along the SONET descrambled data bus 421 and transmits B1/B2/B3 error counts to the B1/B2/B3 BER monitor 440 along a byte error control line 431. The section/line/path bytes delineator 430 delineates SONET section, line and path bytes from the descrambled frames and conducts parity checks over the section, line and path section of the frame and compares them against the received B1/B2/B3 bytes to generate the B1/B2/B3 error counts.

The B1/B2/B3 BER monitor 440 accepts as input the B1/B2/B3 error counts along the byte error control line 431 and transmits a byte BER figure of merit along a byte BER figure of merit control line 441 to the microcontroller 470. The byte BER figure of merit is generated as a function of the number of B1/B2/B3 errors accumulated over a pre-determined period of time.

The microcontroller 470 accepts as input the SONET sync indication along the SONET sync control line 412 and the byte BER indication along the byte BER indication control line 441, determines whether or not there has been convergence, and if not, generates a set of initial conditions along an initial condition control line 471 to the digital signal processor 380. These sets of initial conditions may be generated in a manner familiar to those having ordinary skill in this art, including but not limited to being pre-defined and/or hard-coded, user-defined, randomly generated or reformatted in an adaptive manner from previous applications of the present invention.

The microcontroller 470 also starts the LMS algorithm and monitors that SONET sync and/or good BER performance is achieved.

Those having ordinary skill in this art will readily recognize that still other Layer 1 and Layer 2 protocols may be appropriated in other communications systems by making corresponding adjustments to the protocol machine 130.

The present invention can be implemented in digital electronic circuitry, or in computer hardware, firmware, software, or in combination thereof.

Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; CD-ROM disks; and buffer circuits such as latches and/or flip flops. Any of the foregoing can be supplemented by, or incorporated in ASICs (application-specific integrated circuits), FPGAs (field-programmable gate arrays) or DSPs (digital signal processors).

Examples of such types of computers are the microcontroller 370, 470 and digital signal processor 380 contained in the protocol machine 130, suitable for implementing or performing the apparatus or methods of the invention. The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

What is claimed is:

1. A method for establishing convergence of an adaptive equalizer in a receiver of an asynchronous communications system, the adaptive equalizer for removing inter-symbol interference (ISI) from a received data stream before providing it to a clock and data recovery module, the method comprising the steps of:
   a. configuring the equalizer with an initial set of input conditions;
   b. performing Layer 1 protocol delineation and framing on a recovered data stream from the clock and data recovery module;
   c. determining whether the Layer 1 protocol delineation and framing exceeded a minimum Layer 1 threshold performance indicative of achieving a satisfactory bit error rate (BER) for the Layer 1 protocol delineation and framing;
   d. if the Layer 1 protocol delineation and framing did not exceed the minimum Layer 1 threshold performance, reconfiguring the equalizer with a subsequent set of input conditions and repeating steps b. through d;
   e. calculating a bit error rate of the Layer 1 protocol delineation and framing;
   f. if the bit error rate for the Layer 1 protocol delineation and framing exceeds a minimum acceptable Layer 1 bit error rate, reconfiguring the equalizer with a subsequent set of input conditions and repeating steps b. through f.
   g. performing Layer 2 protocol delineation and framing on a recovered data stream from the clock and data recovery module;
   h. determining whether the Layer 2 protocol delineation and framing exceeded a minimum Layer 2 threshold performance indicative of achieving a satisfactory bit error rate (BER) for the Layer 2 protocol delineation and framing; and
   i. if the Layer 2 protocol delineation and framing did not exceed the minimum Layer 2 threshold performance, reconfiguring the equalizer with a subsequent set of input conditions and repeating steps b. through i.

2. A method for establishing convergence of an adaptive equalizer according to claim 1, wherein the Layer 1 protocol is selected from a group consisting of PCS and SONET.

3. A method for establishing convergence of an adaptive equalizer according to claim 1, wherein the step of configuring comprises configuring the equalizer with an initial set of input equalizer coefficients.

4. A method for establishing convergence of an adaptive equalizer according to claim 1, wherein the step of performing comprises performing block sync delineation.

5. A method for establishing convergence of an adaptive equalizer according to claim 4, wherein the step of performing block sync delineation comprises looking for a consecutive number of good sync bits.

6. A method for establishing convergence of an adaptive equalizer according to claim 5, wherein the number of good sync bits is 64 in number.

7. A method for establishing convergence of an adaptive equalizer according to claim 1, wherein convergence is declared at a Layer 1 level if the Layer 1 protocol delineation and framing exceeds the minimum Layer 1 threshold performance.

8. A method for establishing convergence of an adaptive equalizer according to claim 1, wherein the step of calculating comprising counting a number of block decode errors.

9. A method for establishing convergence of an adaptive equalizer according to claim 8, wherein the step of calculating comprises counting a number of sync header errors.

10. A method for establishing convergence of an adaptive equalizer according to claim 9, wherein the step of calculating comprises adding the number of block decode errors and the number of sync header errors.

11. A method for establishing convergence of an adaptive equalizer according to claim 1, wherein convergence is proven at a Layer 1 level if the bit error rate falls below the minimum acceptable Layer 1 bit error rate.

12. A method for establishing convergence of an adaptive equalizer according to claim 1, wherein the Layer 2 protocol is PCS.

13. A method for establishing convergence of an adaptive equalizer according to claim 1, wherein the step of performing Layer 2 protocol delineation and framing comprises performing Ethernet framing.

14. A method for establishing convergence of an adaptive equalizer according to claim 1, wherein the step of performing Layer 2 protocol delineation and framing comprises:
calculating frame check sequences and identifying frame check sequence errors.

15. A method for establishing convergence of an adaptive equalizer according to claim 1, wherein convergence is declared at a Layer 2 level if the Layer 2 protocol delineation and framing exceeds the minimum Layer 2 threshold performance.

16. A method for establishing convergence of an adaptive equalizer according to claim 1, further comprising the steps of:
j. calculating the bit error rate of the Layer 2 protocol delineation and framing; and
k. if the bit error rate for the Layer 2 protocol delineation and framing did not fall below a minimum acceptable Layer 2 bit error rate, reconfiguring the equalizer with a subsequent set of input conditions and repeating steps b. through k.

17. A method for establishing convergence of an adaptive equalizer according to claim 16, wherein convergence is proven at a Layer 2 level if the bit error rate falls below the minimum acceptable Layer 2 bit error rate.

18. An adaptive equalizer for use in a receiver of an asynchronous communications system, the adaptive equalizer comprising:
a. an equalizer module for removing inter-symbol interference (ISI) from an incoming data stream in accordance with a set of input conditions and generating an equalized data stream;
b. a clock and data recovery module for recovering a clock signal and a plurality of data bits from the equalized data stream;
c. a Layer 1 protocol delineation and framing subsystem for performing Layer 1 protocol delineating and framing on the data bits;
d. a Layer 1 protocol delineation and framing monitor for determining whether the Layer 1 protocol delineation and framing exceeded a minimum Layer 1 threshold performance indicative of achieving a satisfactory bit error rate (BER) for the Layer 1 protocol;
e. an equalizer condition generator for generating an initial set of input conditions for the equalizer module and for generating a second set of input conditions for the equalizer module if the Layer 1 protocol delineation and framing, performed on the plurality of data bits recovered from the equalized data stream corresponding to a current set of input conditions of the equalizer module, did not exceed the minimum Layer 1 threshold performance;
f. a Layer 1 protocol delineation and framing bit error rate (BER) calculator for determining a bit error rate for the Layer 1 protocol; and
g. a Layer 2 protocol delineation and framing monitor for determining whether the Layer 2 protocol delineation and framing exceeded a minimum Layer 2 threshold performance indicative of achieving a satisfactory bit error rate (BER) for the Layer 2 protocol;
wherein:
the equalizer condition generator is adapted to generate a third set of input conditions for the equalizer module if the Layer 2 protocol delineation and framing, performed on the plurality of data bits recovered from the equalized data stream corresponding to a current set of input conditions of the equalizer module, did not exceed the minimum Layer 2 threshold performance.

19. An adaptive equalizer according to claim 18, wherein the clock and data recovery module is a Hogge type phase detector.

20. An adaptive equalizer according to claim 18, wherein the Layer 1 protocol delineation and framing sub-system comprises:
a PCS block sync delineator to find a consecutive number of good sync bits.

21. An adaptive equalizer according to claim 20, wherein the consecutive number of good sync bits is 64 in number.

22. An adaptive equalizer according to claim 18, wherein the Layer 1 protocol delineation and framing sub-system comprises a 64/66 PCS descrambler.

23. An adaptive equalizer according to claim 18, wherein the Layer 1 protocol delineation and framing sub-system comprises a 64/66 PCS block decoder.

24. An adaptive equalizer according to claim 18, wherein the equalization condition generator comprises a microcontroller for receiving and processing convergence indications from the Layer 1 protocol delineation and framing sub-system and generating convergence signals therefrom.

25. An adaptive equalizer according to claim 24, wherein the Layer 1 protocol delineation and framing sub-system generates and forwards a PCS sync convergence indication to the microcontroller.

26. An adaptive equalizer according to claim 24, wherein the equalization condition generator comprises a digital signal processor (DSP) for generating a set of equalizer coefficients for the equalizer module in response to feedback from the equalizer module and the convergence signals.

27. An adaptive equalizer according to claim 24,
wherein the equalizer condition generator is adapted to generate a fourth set of input conditions for the equalizer module if the Layer 1 protocol delineation and framing, performed on the plurality of data bits recovered from the equalized data stream corresponding to a current set of input conditions of the equalizer, had a bit error rate for the Layer 1 protocol that exceeded a minimum acceptable Layer 1 threshold.

28. An adaptive equalizer according to claim 27, wherein the Layer 1 protocol delineation and framing bit error rate (BER) calculator generates and forwards a BER convergence indication to the microcontroller.

29. An adaptive equalizer according to claim 28, wherein the Layer 1 protocol delineation and framing bit error rate (BER) calculator further comprises a sync header BER monitor for generating a sync header BER figure of merit.

30. An adaptive equalizer according to claim 29, wherein the Layer 1 protocol delineation and framing further comprises a block decode BER monitor for generating a block decode BER figure of merit.

31. An adaptive equalizer according to claim 30, wherein the BER convergence indication comprises a weighted combination of the sync header BER figure of merit and the block decode BER figure of merit.

32. An adaptive equalizer according to claim 27, further comprising:
  h. a Layer 2 protocol delineation and framing bit error rate (BER) calculator for determining a bit error rate for the Layer 2 protocol;
  wherein the equalizer condition generator is adapted to generate a fifth set of input conditions for the equalizer module if the Layer 2 protocol delineation and framing, performed on the plurality of data bits recovered from the equalized data stream corresponding to a current set of input conditions of the equalizer, had a bit error rate for the Layer 2 protocol that exceeded a minimum acceptable Layer 2 threshold.

33. An adaptive equalizer according to claim 32, wherein the Layer 2 protocol delineation and framing bit error rate (BER) calculator generates and forwards a Layer 2 BER convergence indication to the microcontroller.

34. An adaptive equalizer according to claim 32, wherein the Layer 2 protocol delineation and framing bit error rate (BER) calculator further comprises an FCS BER monitor for generating the Layer 2 BER convergence indication.

35. An adaptive equalizer according to claim 32, wherein the Layer 2 protocol delineation and framing bit error rate (BER) calculator comprises an Ethernet framer.

36. An adaptive equalizer according to claim 32, wherein the Layer 2 protocol delineation and framing bit error rate (BER) calculator comprises an FCS calculator.

* * * * *